United States Patent Office 3,524,246
Patented Aug. 18, 1970

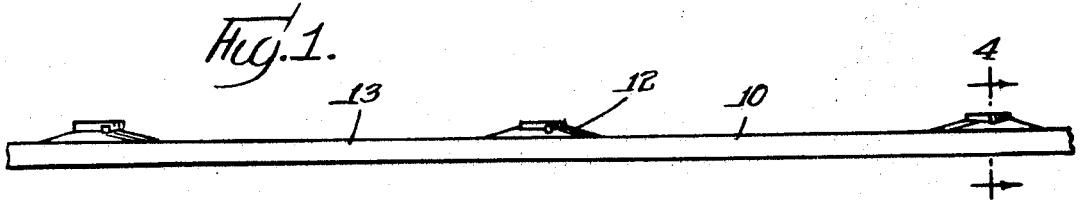
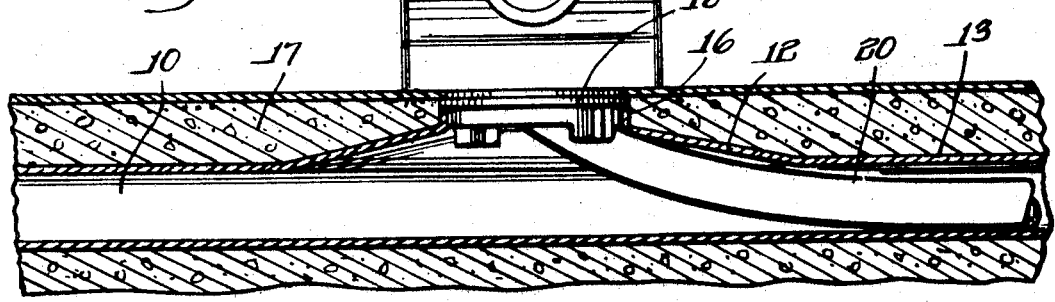
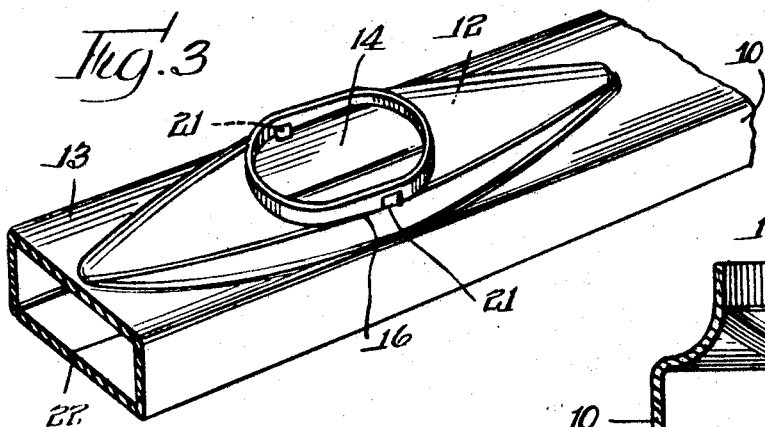
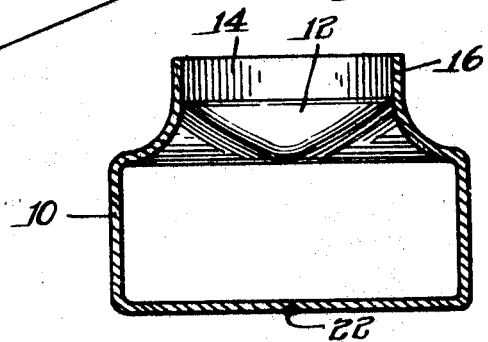
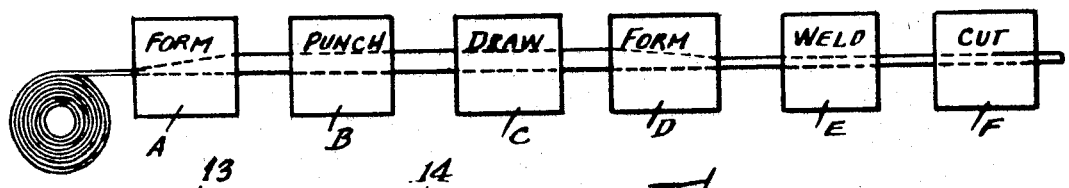
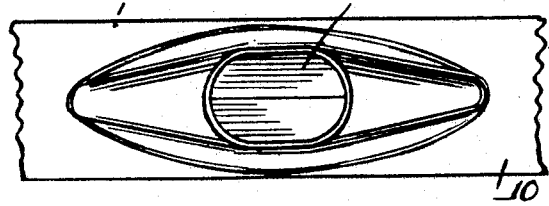

3,524,246
METHOD OF MAKING AN UNDER-FLOOR WIRING DUCT
James W. Hudson, Colin Fernie, and Michael J. Mayer, Lexington, Ky., assignors to Square D Company, Park Ridge, Ill., a corporation of Michigan
Continuation of abandoned application Ser. No. 324,923, Nov. 20, 1963. This application May 16, 1967, Ser. No. 642,638
Int. Cl. B23k 31/02
U.S. Cl. 29—477.7                                              1 Claim

ABSTRACT OF THE DISCLOSURE

The duct is made by punching a plurality of holes in a flat elongated strip of sheet metal, the holes being spaced and elongated longitudinally of the strip, drawing the strip around said holes to provide raised dome portions and collar portions integral therewith, forming the strip into a duct of rectangular cross section, and welding opposite longitudinal edge portions of the strip together.

CROSS-REFERENCE TO RELATED APPLICATION

This application is a continuation of copending application, Ser. No. 324,923, filed on Nov. 20, 1963, now abandoned.

This invention relates generally to underfloor wiring duct, and more particularly to the portions thereof defining access openings therein.

Formerly, access openings in underfloor duct were circular, the entire upper wall portion of the duct was flat, and cylindrical inserts were crimped to the upper wall portion of the duct at the inner surface thereof adjacent the circular openings. A relatively sharp corner was thus presented at the junction of the cylindrical inserts and the upper wall portion of the duct, and difficulty was encountered in bending large telephone cables within the duct through the ninety degree angle in the limited space available to permit an end portion of the cable to extend through the opening. In accordance with this invention, the access openings are elongated longitudinally of the duct and the upper wall portion of the duct around the access openings is shaped to form raised dome portions. The elongated access openings afford greater and easier access to wires or cables within the duct and also permit an increase in the bending radius of hard-to-bend cables. The raised dome portions around the access openings permit a further increase in the bending radius of cables.

An object of the invention is to provide an improved underfloor wiring duct.

Another object is to provide an underfloor wiring duct having spaced access openings which are elongated longitudinally of the duct.

An additional object is to provide an underfloor wiring duct including a wall portion having raised dome portions spaced longitudinally of the duct and access openings respectively generally centered in and extending through the raised dome portions.

A further object is to provide an underfloor wiring duct including a wall portion having access openings spaced longitudinally of the duct and defined respectively by collar portions formed integrally with the wall portion and extending outwardly therefrom.

Still another object is to provide an underfloor wiring duct including a wall portion having raised dome portions spaced longitudinally of the duct and also elongated longitudinally of the duct, and access openings respectively generally centered in and extending through the raised dome portions.

A still further object is to provide an underfloor wiring duct including a wall portion having raised dome portions spaced longitudinally of the duct and also elongated longitudinally of the duct, and access openings respectively generally centered in and extending through the raised dome portions, the access openings being elongated longitudinally of the duct and being defined respectively by collar portions formed intetgrally with the raised dome portions and extending outwardly therefrom.

Other objects and advantages will appear when the following specification is considered along with the accompanying drawings, in which:

FIG. 1 is a fragmentary side elevational view of an underfloor wiring duct constructed in accordance with the invention;

FIG. 2 is an enlarged fragmentary side-elevational longitudinal-sectional view of the underfloor wiring duct of FIG. 1 embedded in a concrete floor and having a telephone service outlet fitting connected to an access opening thereof;

FIG. 3 is a fragmentary perspective view of the underfloor wiring duct of FIG. 1 particularly showing an access opening thereof;

FIG. 4 is a cross sectional view taken substantially along the line 4—4 of FIG. 1;

FIG. 5 is a diagrammatic sketch illustrating the steps in the manufacture of the wiring duct of FIG. 1; and FIG. 6 is a plan view of a portion of the underfloor wiring duct of FIG. 1.

FIG. 1 shows a length of underfloor wiring duct 10 constructed in accordance with the invention. A plurality of raised dome portions 12 are provided in an upper wall portion 13 of the duct 10 and are spaced apart from each other longitudinally of the duct.

As shown best n FIGS. 2 and 4, the raised dome portions 12 are elongated longitudinally of the duct and their outlines in the wall portion 13 are generally diamond-shaped. An access opening 14 is provided centrally of each raised dome portion 12. The access openings 14 are elongated longitudinally of the duct and might be described as generally elliptical in shape, although preferably they are defined by two semicircles connected by two straight lines. The access openings 14 are respectively surrounded by a plurality of collar portions 16 formed integrally with the dome portions 12 and extending outwardly therefrom.

The raised dome portions 12 also respectively provide storage space for plug-in type connectors (not shown) on the ends of cables such as cable 20 when service from outlet fittings such as fitting 19 is temporarily abandoned. Further, the provision of the raised dome portions 12 also aids in the proper formation of the outwardly extending collar portions 16.

A pair of indentations 21 (FIG. 3) are provided on the collar portions 16 for receiving detents on collar extensions (not shown) securable to collar portions 16 to accommodate concrete floors of greater thickness.

FIG. 5 diagrammatically illustrates the steps in the manufacture of the duct by a continuous forming process. A coil of flat sheet steel is fed successively through a roll forming station A, a punching station B, a drawing station C, a roll forming station D, a welding station E, and a cutting station F. In station A, the flat sheet is formed into a channel-shape. In station B, holes smaller than the access openings 14 are successively punched through the bottom of the channel-shape, which later becomes the upper wall portion of the duct, and the indentations 21 are formed. In station C, the raised dome portions 12 and integral collar portions 16 are drawn around the openings which were punched in station B and the access openings 14 are thereby brought to their final size and shape. In station D, the channel-shape is formed into the final rectangular shape of the duct. In station E, the opposite edges of the formed sheet steel are welded together, as indicated by the numeral 22 in FIGS. 3 and 4. In station F, the duct is cut to standard lengths.

Various modifications may be made in the structure shown and described without departing from the spirit and scope of the invention as set forth in the appended claim.

We claim:

1. A method of making an underfloor wiring duct comprising providing an elongated flat strip of sheet metal, punching said strip to form a plurality of holes therein spaced and elongated longitudinally thereof, drawing said strip to form a plurality of raised dome portions respectively concentric with said holes and elongated longitudinally of said strip, to enlarge said holes, and to form a plurality of collar portions integral respectively with said raised dome portions, concentric respectively with said holes, elongated longitudinally of said strip, and extending respectively from said raised dome portions perpendicularly to portions of said strip between said raised dome portions, forming said strip into a duct of generally rectangular cross section, and welding original opposite longitudinal edge portions of said strip together.

References Cited

UNITED STATES PATENTS

| 1,815,840 | 7/1931 | Frank. | |
| 1,830,262 | 11/1931 | Carlson | 29—157 |
| 2,297,179 | 9/1942 | Walker | 52—221 |
| 2,793,421 | 5/1957 | Brumbaugh | 29—477 X |

JOHN F. CAMPBELL, Primary Examiner

D. C. REILEY, Assistant Examiner

U.S. Cl. X.R.

29—157, 482; 113—116